April 24, 1951     W. A. RAY     2,550,297
ELECTROMAGNETICALLY OPERATED VALVE
Filed Sept. 4, 1944     2 Sheets-Sheet 1
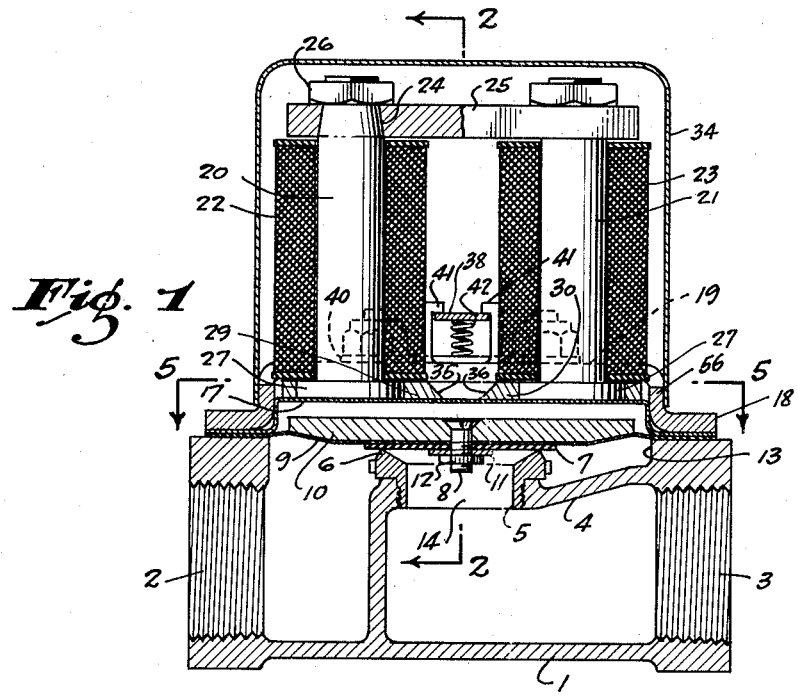
Fig. 1
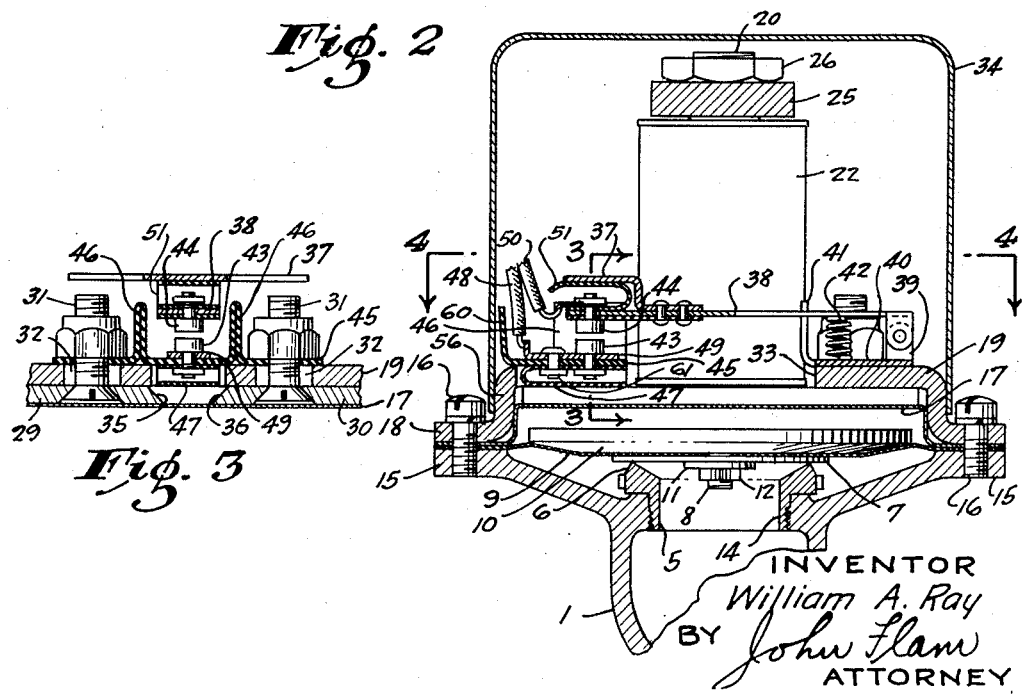
Fig. 2
Fig. 3
INVENTOR
William A. Ray
BY John Flam
ATTORNEY April 24, 1951 W. A. RAY 2,550,297
ELECTROMAGNETICALLY OPERATED VALVE
Filed Sept. 4, 1944 2 Sheets-Sheet 2
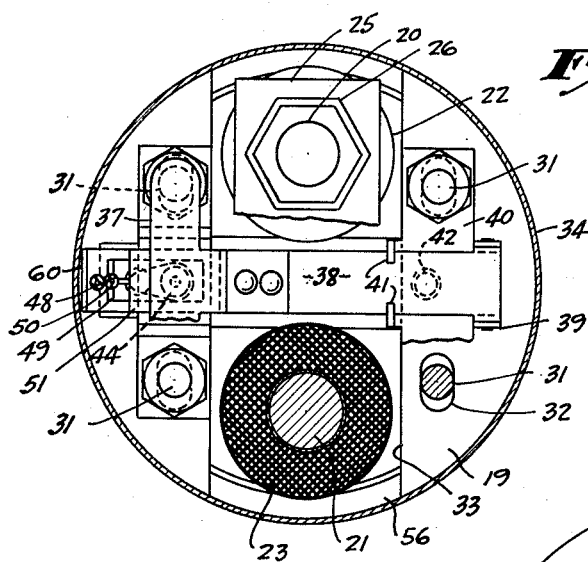
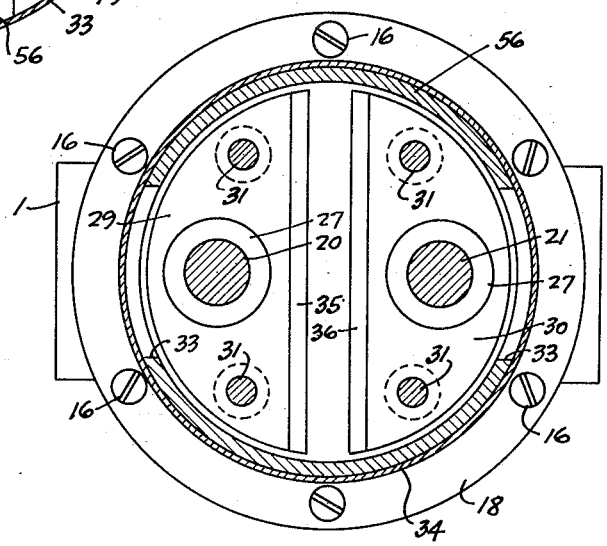
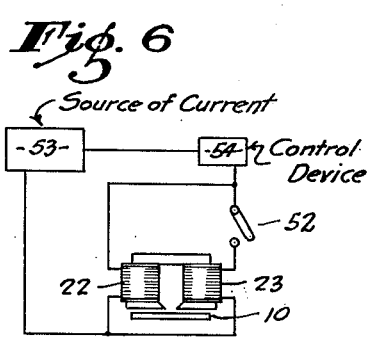
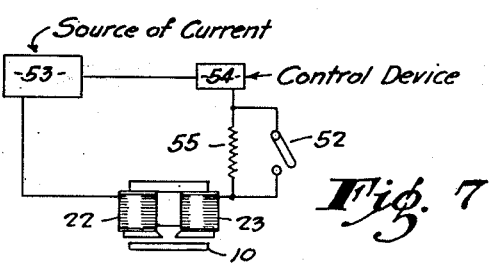
INVENTOR
William A. Ray
BY John Flann
ATTORNEY Patented Apr. 24, 1951

2,550,297

UNITED STATES PATENT OFFICE 2,550,297

ELECTROMAGNETICALLY OPERATED VALVE

William A. Ray, Glendale, Calif., assignor to General Controls Co., a corporation Application September 4, 1944, Serial No. 552,647

7 Claims. (Cl. 137—139)

This invention relates to a valve, and particularly to a valve that is controlled electromagnetically.

This application is a continuation, in part, of a prior application filed in the name of William A. Ray on August 27, 1942 under Serial No. 456,358, now Patent 2,358,828, granted September 26, 1944, and entitled "Electromagnetic Operator."

It has been common in the past to utilize an electromagnet for mechanically moving a valve closure. The electromagnet structure is often conveniently mounted upon the valve body, so that the closure structure may be carried by or even include an armature that is arranged to be attracted by the electromagnet. In this way a compact device is obtained.

It being very desirable to maintain this compactness, valve structures of this character permit the heat generated by operation of the electromagnet to find a ready path through the fluid being controlled. In many cases this transfer of heat to the fluid is of no consequence.

One type of fluid that is conveniently handled by valves of this character is gaseous fuel, such as natural or artificial gas. In such cases, it has been found that the gas has a constituent that can be separated out by the action of heat in the form of a gummy, or viscous mass. After an interval of use, this deposit forms a coating on the valve parts, and which interferes with the operation of the valve. Proper seating of the closure is rendered difficult; and the valve parts are apt to stick in either open or closed position. Such likelihood of failure cannot be tolerated; and, accordingly, it is necessary to replace or remove and clean the fouled parts.

It is one of the objects of this invention to obviate such occurrences in spite of the proximity of the electromagnet to the interior working parts of the valve.

In order to accomplish these results, the electromagnet is so constructed, and is so arranged with respect to the valve that the power required to operate the electromagnet is quite low, and insufficient to cause separation of the gummy constituent from the gas. The low power consumption (of the order of a few watts) can lift the valve closure off its seat far enough for full valve operation.

It is another object of this invention to provide an improved electromagnet structure, and particularly one in which a supplemental control function can be readily performed. This is accomplished by the aid of an auxiliary armature that is attracted when the electromagnet is energized, but which drops out when the main armature is attracted.

It is accordingly still another object of this invention to provide this kind of an electromagnetic operator, utilizing a main and an auxiliary armature.

This invention possesses many other advantages, and has other objects which may be made more clearly apparent from a consideration of several embodiments of the invention. For this purpose there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings:

Fig. 1 is a longitudinal sectional view of a valve incorporating the invention;

Fig. 2 is a sectional view, taken along plane 2—2 of Fig. 1;

Fig. 3 is an enlarged sectional view, taken along plane 3—3 of Fig. 2;

Fig. 4 is a sectional view, taken along plane 4—4 of Fig. 2;

Fig. 5 is a sectional view, taken along plane 5—5 in Fig. 1;

Fig. 6 is a wiring diagram of a system in which the valve is incorporated; and

Fig. 7 is a view, similar to Fig. 6, of a modified form of the invention.

The valve includes a valve body 1 in which all of the valve parts are accommodated. It may be formed appropriately as a metal casting. The fluid controlled by the valve may be a gaseous fuel.

The valve body 1 has an inlet opening 2 and an outlet opening 3. Intermediate these openings is a partition 4 separating the inlet passageway from the outlet passageway. This wall 4 is provided with a member 5 that forms a circular valve seat 6, and that is threaded into an opening in the wall 4. A port 14 extends through member 5; and the gas, in passing through the valve, flows downwardly through this port. As shown most clearly in Figs. 1 and 2, seat 6 is quite sharply defined by sloping annular sides.

A disc-like valve closure member 7 is adapted to close the valve by resting upon the seat 6. The closure member is fastened, as by the aid of a screw 8, to a flexible diaphragm 9. A washer 11 may be interposed between the closure member 7 and the fastening nut 12 of screw 8. The screw 8 also serves to attach the diaphragm 9 to the disc-like armature 10, arranged above the diaphragm and concentric with the seat 6. As will be described hereinafter, this armature is attracted by an electromagnet to lift the closure 7 from its seat and open the valve.

The upper portion of the valve body 1 has a large circular opening 13 which is also concentric with the axis of the valve seat 6. This opening 13 is somewhat larger than the armature 10, and is covered by diaphragm 9. The edge of this diaphragm extends over a flange 15 (Fig. 2) of body 1. This edge may be clamped in sealing relation to the valve body 1, as by the cap screws 16 (see, also, Fig. 5), which pass through a clamping flange 18.

A cup-shaped, thin, non-magnetic sealing member 17 also has an outer flange disposed over the edge of diaphragm 9, and held in sealing relation to the body 1 by the cap screws 16. This member 17 is disposed immediately above the armature 10, and its lower surface serves as a stop for the armature 10 when it is lifted to open the valve.

The clamping flange 18 is made a part of a supporting member 19, formed of non-magnetic material (Fig. 2). It is by the aid of this member that the stationary parts of the magnetic circuit for the electromagnet are supported. This supporting member overlies the cup member 17, and is joined to flange 18 by the circular portion 56 (Figs. 2 and 5).

The magnetic circuit includes a pair of spaced parallel, vertical cores 20 and 21, symmetrically arranged with respect to the axis of the port 14. The cores pass through a rather wide central slot 33 (Fig. 4) formed in support 19. Over these core members are disposed respectively the energizing coils 22 and 23. The upper ends of the cores 20 and 21 are shown as having wide, tapered surfaces 24 (Fig. 1) for intimate magnetic contact with a bar 25 that joins these upper ends. The bar 25 is urged into close magnetic relationship with the surfaces 24, as by the aid of self-locking nuts 26 disposed over threaded ends of the cores 20, 21.

The lower ends of the cores have enlarged heads 27 (Figs. 1 and 5). These heads are disposed below the supporting member 19, as shown most clearly in Fig. 1. To these portions 27 are attached, as by welding, the substantially semi-circular pole pieces 29 and 30 (Figs. 1 and 5). The lower surfaces of these pole pieces are disposed immediately above the sealing member 17. These pole pieces together define an interrupted circular polar area slightly larger than the circular area of the armature 10, and very much greater than the cross sectional areas of cores 20, 21. This feature is of importance to reduce the power consumption of the electromagnet, as will be discussed hereinafter. The polar areas are parallel to the upper surface of the armature 9, and thus define a small air gap with said surface. Each of the pole pieces 29 and 30 is attached to the member 19 by the aid of a pair of flat head screws 31 (Figs. 3, 4, and 5). The apertures 32 (Fig. 4) in the member 19, through which the screws 31 pass, are shown slightly elongated in order to make it possible accurately to position the pole pieces with respect to the other operating parts of the electromagnet.

By referring to Figs. 1 and 5, the specific features of the invention that ensure against undesirable temperature rise may be discussed.

The ampere-turns required to produce a definite magnetization is dependent upon mainly two factors: the magnetic density, and the reluctance of the magnetic path. The pull, however, is a function of the polar areas; accordingly, if we increase the polar area without increasing the reluctance, the pull of the electromagnet is correspondingly increased without the necessity of increasing the ampere-turns. But, by increasing the polar area and by reducing the air-gap, the ampere-turns can be still further reduced, since the reluctance is reduced.

Accordingly, in the present instance, the effective area of armature 10 and the polar areas of pole pieces 29 and 30 are made much larger than in a conventional design. The armature itself is made just as large as permitted by the limiting dimensions of the valve body 1, and is only slightly smaller than the large wall opening 13. The pole pieces cover substantially the entire armature, and overlap it slightly. The lift or air-gap is maintained small. In order to obtain a large annular opening between seat 6 and the armature 10 when the electromagnet is energized, the perimeter of this seat is large—at least thirty times the length of the air-gap. The length of the air gap is not more than one-tenth of the longest dimension of the upper surface of the armature 9. When the armature is circular, as in this case, the longest dimension is, of course, the diameter.

Furthermore, in order to ensure that the coils 22 and 23 utilize as little wire as possible, the mean length of turn of the coil is kept down by making cores 20 and 21 quite small. Thus, the polar areas are very much greater than the cross sectional areas of the cores. And in order to ensure that substantially all of the reluctance be represented by the air-gap, the magnetic parts comprising the remainder of the magnetic circuit should be made from high permeability materials, and the parts should be well joined together or formed integrally; hence, the proposal is made to weld the pole pieces 29, 30, to the ends 27 of the cores 20, 21, and also to urge the bar 25 into tight contact with the wide tapered surfaces 24 at the upper ends of the cores.

The large polar areas, extending beyond the edge of armature 10, also ensure against any material tilting of the armature as it moves from one position to another. These large areas have an additional advantage. The total flux passing through the air-gap is very high, for it represents the product of the area of the pole face and the density. Accordingly, the inductance is correspondingly high. A considerable period of time must elapse for the magnetism to build up to full strength. Therefore, when the electromagnet is energized, the attraction of the armature is accomplished slowly, and the result is a quieter, softer operation. Such effects are of importance in fuel valves, for they are often placed adjacent air conduits that amplify and conduct sound to the air outlets.

By utilizing these principles, a valve having a port of five-eighths ($\frac{5}{8}$) of an inch may be effectively operated by an electromagnet consuming no more than from a fractional watt up to a few watts. In such a case, the lift of the armature may be as little as one-sixteenth ($\frac{1}{16}$) or three thirty-seconds ($\frac{3}{32}$) of an inch.

Thus, by providing a small air-gap and large polar areas with low magnetic reluctance through the magnetic portions of the circuit, the expenditure of energy in the coils 22 and 23 is insufficient to cause any objectionable heating of the fluid passing through the valve.

If desired, a dust-proof sheet metal cover 34 may be telescoped over the cylindrical portion 56 of the supporting member 19. Appropriate bushings may be provided therein for the passage of leads to the coils 22 and 23.

The cup member 17 ensures that in the attracted position the armature 10 will be separated from the pole pieces by a very small gap, ensuring against sticking of the armature when the coils 22 and 23 are deenergized.

Since the polar areas are made as great as possible within the bounds defined by the support 19, the adjacent edges of the pole pieces 29 and 30 may approach quite close together. This is illustrated most clearly in Figs. 3 and 5.

In order to reduce magnetic leakage between the pole pieces, these edges are bevelled as indicated by the surfaces 35, 36 (Figs. 3 and 5). These bevelled edges recede from each other, so that there are only knife-like surfaces adjacent each other which introduce a substantial reluctance to leakage flux.

The electromagnet, in the present instance, is further arranged to operate a circuit controlling device, such as a switch. This circuit controlling device is so arranged that it is operated through a complete cycle when the electromagnet is energized, the controller remaining thereafter inactive until the electromagnet is again energized.

For this purpose use is made of an auxiliary armature 37 (Figs. 2, 3, and 4). This auxiliary armature extends immediately above the ends of a pair of fastening bolts 31 which are purposely made of magnetic material, and which, as heretofore explained, serve to attach pole pieces 29 and 30 to member 19. One of the bolts 31 is in contact with pole piece 29, and the other is in contact with pole piece 30. Accordingly, they are of opposite polarity and can effectively attract the relatively light armature 37 when the electromagnet is first energized. Since the armature is light, it moves rapidly downwardly to the attracted position. However, as soon as the main armature 10 is attracted, substantially all of the flux passes through the main armature, and the auxiliary armature 37 returns to its unattracted position.

Thus, the pole pieces 29 and 30 serve, at their lower faces, to co-operate with the main armature 10; while their upper faces, in conjunction with the bolts 31, co-operate with the auxiliary armature 37.

The auxiliary armature 37, as shown most clearly in Fig. 2, is attached to a non-magnetic arm 38 which extends between the two coils 22 and 23 (Figs. 1 and 4). This arm 38 is shown as pivotally mounted upon a bracket 39 formed integrally with a non-magnetic support 40. This support 40 is attached by bolts 31 to the top of the supporting member 19. Member 40 is also provided with a pair of projections 41 which extend above the arm 38 and limit its upward movement. A compression spring 42 is interposed between the arm 38 and support 40 to urge the arm 38 to the unattracted position of Fig. 2.

In the unattracted position, contacts 43 and 44 are disengaged. Contact 43 is stationary, and contact 44 is carried by the arm 38 and is insulated therefrom in a manner to be hereinafter described.

Stationary contact 43, as shown most clearly in Fig. 3, is supported on a strip of relatively rigid insulation material 45 which is fastened to the upper surface of member 19 by the bolts 31. This supporting member is folded to form the upright walls 46 partially to enclose the contacts 43 and 44. Furthermore, a thin, flexible insulation strip 47 may be folded underneath the support 45 to ensure that the contact member 43 and the co-operating current-carrying parts will remain electrically insulated from the support 19. The insulation support 45 (Fig. 2) is provided with a shielding wall 60 to ensure against any current-carrying member touching cover 34. A lead 48 for the contact member 43 may be joined to a metal terminal 49 disposed above the supporting strip 45. This terminal is held to the strip 45 as by a bolt 61 and by the shank of contact member 43.

Similarly, the movable contact 44 is supported by the left-hand end of arm 38, as viewed in Fig. 2. Appropriate insulation is provided between these parts. A lead 50 is connected to the contact 44. A thin, flexible sheet of insulation 51 is folded so as to be interposed between the lower surface of armature 37 and contact member 44.

A circuit controller comprising contacts 43 and 44 may be utilized in any of numerous ways. Thus, in the form shown in Fig. 6, the circuit controller, which is now designated by reference character 52, is shown as in circuit with coil 23. We may assume that a gas burner is supplied with fuel through the electromagnetically operated valve, energized by an appropriate source of current 53. A control device 54, such as a thermostat, may also be included in circuit. When the thermostat 54 causes energization of the electromagnet, the coil 22 is first energized, coil 23 being open-circuited by the circuit controller 52 which comprises contacts 43 and 44. Energization of coil 22 alone is sufficient to attract auxiliary armature 37, but is not sufficient to attract the main, heavier armature 10. As soon as the auxiliary armature 37 is attracted, the circuit controller 52 closes, and both coils 22 and 23 are active. The main armature 10 is now attracted; but much less power is required to hold the armature 10 in attracted position, once it is moved to that position. Accordingly, this result is obtained; for, as soon as armature 10 is attracted, the auxiliary armature 37, returning to its unattracted position, causes the circuit controller 52 to deenergize coil 23.

This circuit controller 52 thus ensures that electrical power sufficient to attract the main armature 10 is consumed only momentarily; and thereafter the armature 10 is held in attracted position by the expenditure of much less power.

In the form shown in Fig. 7, the circuit controller 52 is shown as short-circuiting a resistance 55. In this instance, coils 22 and 23 are shown connected in series with the resistance 55. When the circuit controller 52 is open, the power consumption is low; when the circuit controller 52 is closed, the power consumption is increased. This increase of power, however, is only momentary, and corresponds to the period during which the main armature 10 is being attracted.

The inventor claims:

1. In combination: a magnetic core having a pair of adjacent legs; energizing means for the core; a pair of pole pieces respectively attached to the legs and having polar areas much greater than the cross sectional areas of the legs; a main movable armature attracted by the poles; and a lightweight auxiliary armature co-operating with that side of the pole pieces which is away from the polar areas, said auxiliary armature having a much smaller cross-section than the main armature, said energizing means being initially insufficient to attract the main armature, but sufficient to attract the auxiliary armature; and means operating while the auxiliary armature is in attracted position to increase the energization of the core to cause said core to attract said main armature; said main armature serving to shunt the auxiliary armature flux for causing said auxiliary armature to return to unattracted position.

2. In combination: a magnetic core having a pair of legs; a pair of pole pieces respectively attached to the ends of the legs; a main armature adapted to be attracted by the poles of the pole pieces; a lightweight auxiliary armature also in the influence of the pole pieces, said auxiliary armature having a flux carrying cross-section much less than that of the main armature, and it requiring substantially less magnetic force to attract the auxiliary armature than the main armature; a coil for magnetizing the core; and a circuit controller operated by the auxiliary armature when in attracted position for temporarily increasing the magnetization of the core, said auxiliary armature being shunted by the main armature in the attracted position of the main armature, for causing the auxiliary armature to return to the unattracted position.

3. In combination: a magnetic core having a pair of legs; a pair of pole pieces respectively attached to the ends of the legs; a main armature adapted to be attracted by the poles of the pole pieces; an auxiliary armature also in the influence of the pole pieces, said auxiliary armature having a flux carrying cross-section much less than that of the main armature, and it requiring substantially less magnetic force to attract the auxiliary armature than the main armature; a pair of coils for magnetizing the core; and a circuit controller operated by the auxiliary armature, for temporarily energizing one of the coils when the auxiliary armature is in attracted position, said auxiliary armature being shunted by the main armature in the attracted position of the main armature, for causing the auxiliary armature to return to the unattracted position and to de-energize the said one of the coils.

4. In combination: an electromagnet having an energizing means; a magnetic structure including a pair of poles pieces, as well as a main movable armature which, when attracted by the pole pieces, serves to bridge the space between the pole pieces; an auxiliary armature in the field of the pole pieces and adapted to bridge them when in attracted position, said auxiliary armature being biased to unattracted position and having an effective cross-section for the flow of magnetic flux that is much less than that of the main armature; means for so initially energizing the electromagnet that only the auxiliary armature is attracted, and that the main armature can be held in attracted position but cannot be moved to said position; means responsive to the movement of the auxiliary armature to attracted position for increasing the energization of the electromagnet to cause the main armature to be attracted and thereby shunt the auxiliary armature so that substantially all the flux passes through the main armature and said auxiliary armature returns to its unattracted position, and thereby causes a reduction of the energization of the electromagnet to its initial extent.

5. In combination: an electromagnet having an energizing means; a magnetic structure including a pair of pole pieces, as well as a main movable armature which, when attracted by the pole pieces, serves to bridge the space between the pole pieces; an auxiliary armature in the field of the pole pieces and adapted to bridge them when in attracted position, said auxiliary armature being biased to unattracted position and having an effective cross-section for the flow of magnetic flux that is much less than that of the main armature; a circuit controller operated by the movement of the auxiliary armature between attracted and unattracted positions; and means controlled by said circuit controller to cause an increase in the energization of the electromagnet while the auxiliary armature is in the attracted position, said increase serving to cause the main armature to be attracted; said main armature serving to shunt the auxiliary armature flux for causing said auxiliary armature to return to unattracted position.

6. In a fluid flow control valve: a valve body having a ported partition with an inlet side and an outlet side; said body having an opening above the port; said port having an edge defining a valve seat; a closure structure adapted to rest on the valve seat and including an armature made from magnetic material disposed adjacent the body opening, said opening and the armature being substantially larger than the port; and electromagnetic means for attracting said armature to open the valve, comprising: means forming a pair of polar areas opposing that armature surface which faces away from the seat, said polar areas extending over the said armature surface and substantially parallel with said surface when the armature is unattracted, to form an air gap the length of which is not more than one-tenth of the longest dimension of said armature surface; said armature assuming an unattracted position adjacent the seat and an attracted position adjacent the polar areas; said polar areas extending over substantially the entire armature surface; magnetic elements completing the magnetic circuit through the armature and the polar areas, and through which the magnetic flux passes; and a coil surrounding a part of said magnetic circuit, said part having a substantially uniform cross-sectional area that is very much less than the area of either polar area.

7. In a fluid flow control valve: a valve body having a ported partition with an inlet side and an outlet side; said body having an opening above the port; said port having an edge defining a valve seat; a closure structure adapted to rest on the valve seat and including an armature made from magnetic material disposed adjacent the body opening, said opening and the armature being substantially larger than the port; and electromagnetic means for attracting said armature to open the valve, comprising: a pair of spaced cores; pole pieces carried by the ends of the cores and opposed to that surface of the armature which faces away from the seat, and adapted to attract said armature to open the valve; said faces defining air gaps with the armature the lengths of which are not more than one-tenth the longest dimension of the opposed armature surface; said pole pieces having polar faces that in combination form an area extending over substantially the entire armature; each core having a substantially uniform cross-sectional area much less than the areas of the corresponding polar face; a bar of magnetic material joining the other ends of the cores and in intimate contact therewith; and a coil disposed over at least one of the cores.

WILLIAM A. RAY.

REFERENCES CITED

The following references are of record in the file of this patent:

UNITED STATES PATENTS

| Number | Name | Date |
|---|---|---|
| 593,481 | Lowrie | Nov. 9, 1897 |
| 945,802 | Pratt et al. | Jan. 11, 1910 |
| 946,215 | Geissinger | Jan. 11, 1910 |
| 1,142,852 | Simon | June 15, 1915 |
| 1,199,792 | Hope-Jones | Oct. 3, 1916 |
| 1,203,825 | Warren | Nov. 7, 1916 |
| 1,252,312 | Warren | Jan. 1, 1918 |
| 1,272,317 | Reed | July 9, 1918 |
| 1,302,511 | Chapman | May 6, 1919 |
| 1,567,190 | Reisner | Dec. 29, 1925 |
| 1,646,956 | Erickson | Oct. 25, 1927 |
| 1,654,642 | Geissinger | Jan. 3, 1928 |
| 1,893,856 | Broughton | Jan. 10, 1933 |
| 1,978,737 | Bower | June 30, 1934 |
| 2,061,920 | Piffath | Nov. 24, 1936 |
| 2,083,475 | Ross | June 8, 1937 |
| 2,098,926 | Schneider | Nov. 9, 1937 |
| 2,142,066 | Eppelsheimer | Dec. 27, 1938 |
| 2,189,597 | Wells | Feb. 6, 1940 |
| 2,211,701 | McGrath | Aug. 13, 1940 |
| 2,235,104 | Greenly | Mar. 18, 1941 |
| 2,268,960 | Ray | Jan. 6, 1942 |
| 2,283,903 | Ashcroft | May 26, 1942 |
| 2,292,478 | Ray | Aug. 11, 1942 |
| 2,319,075 | McKinnis | May 11, 1943 |
| 2,324,642 | Peterson | July 20, 1943 |
| 2,358,828 | Ray | Sept. 26, 1944 |

FOREIGN PATENTS

| Number | Country | Date |
|---|---|---|
| 16,513 | Great Britain | of 1907 |
| 68,913 | Sweden | Aug. 11, 1927 |
| 419,290 | Great Britain | Nov. 1, 1934 |